Jan. 26, 1932. E. L. HOFFMAN 1,842,450
PARACHUTE CONSTRUCTION
Filed Sept. 23, 1930 2 Sheets-Sheet 1
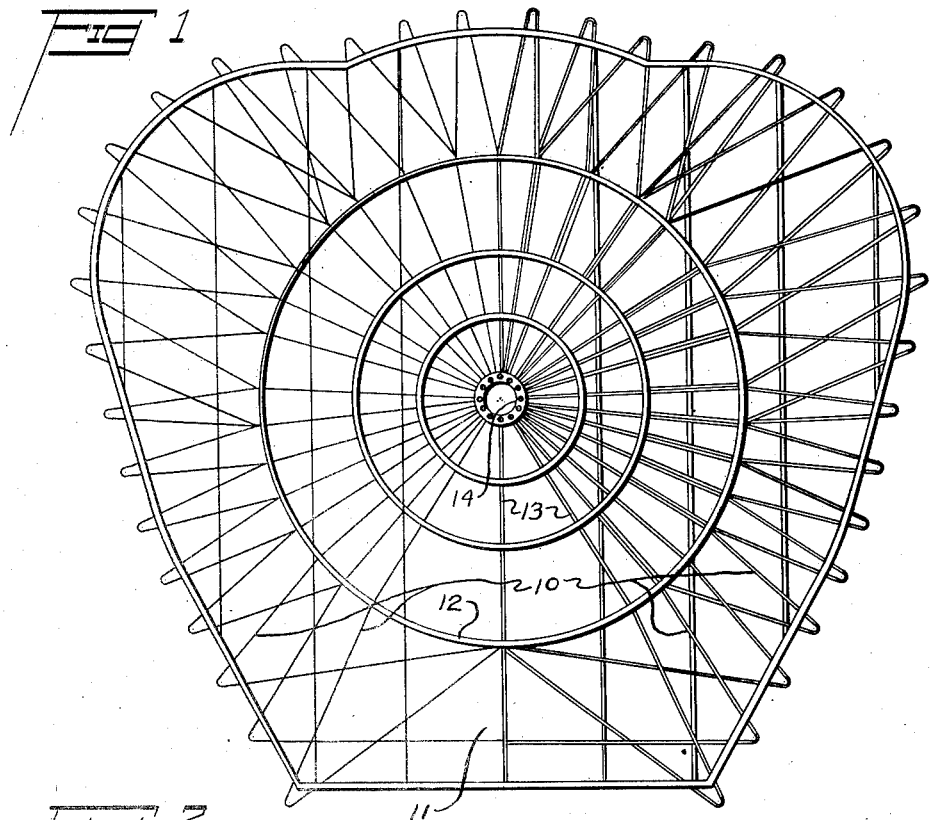
INVENTOR
EDWARD L HOFFMAN
BY Robert H. Young
ATTORNEY Jan. 26, 1932.  E. L. HOFFMAN  1,842,450
PARACHUTE CONSTRUCTION
Filed Sept. 23, 1930   2 Sheets-Sheet 2
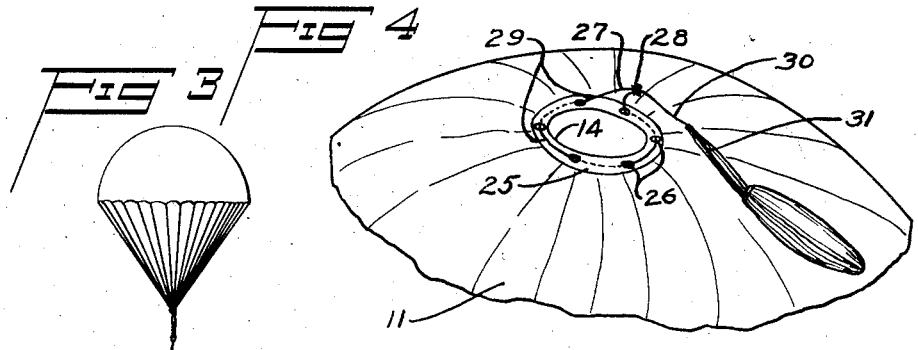
INVENTOR
EDWARD L. HOFFMAN
BY Robert H. Young
ATTORNEY Patented Jan. 26, 1932

1,842,450

UNITED STATES PATENT OFFICE

EDWARD L. HOFFMAN, OF DAYTON, OHIO

PARACHUTE CONSTRUCTION

Application filed September 23, 1930. Serial No. 483,918.

(GRANTED UNDER THE ACT OF MARCH 3, 1883, AS AMENDED APRIL 30, 1928; 370 O. G. 757)

The invention described herein may be manufactured and used by or for the Government for governmental purposes, without the payment to me of any royalty thereon.

The present invention relates generally to improvement in parachutes and more particularly to an improved method of reinforcing the canopy of a parachute so that the stresses imparted to the canopy under load are distributed over its entire surface; very little load is localized in the fabric and the strength-weight ratio of the canopy is at the maximum.

The primary object of the present invention is to provide an improved system of suspension in a parachute whereby the usual load carrying lines for the canopy are replaced by a series of tapes which are secured to the canopy of the parachute, thereby providing a lighter and stronger construction and at the same time providing improved means of connection to the suspension lines which more evenly distributes the stresses throughout the entire surface of the canopy than has been done by previously used systems.

Another object of the invention is to provide a series of criss crossed diverging tapes formed with loops adjacent the periphery of the canopy and at the points of attachment of the suspension lines, which diverging tapes terminate in a reinforcing band which is located intermediate the vent and the periphery of the canopy, thus forming with the diverging tapes a double Warren truss.

The invention further contemplates the provision of radially arranged stress-carrying tapes secured to and cooperating with the aforementioned diverging tapes at their points of attachment to the reinforcing band, which tapes are adapted to carry the combined stresses toward the center of the canopy.

Another object of the invention is to provide loops adjacent the periphery of the canopy such that the suspension lines may be knotted and sewed thereto in such a manner that the knots will have no tendency to cut upon themselves when a load is applied to the suspension lines. Thus the full strength of the suspension lines is obtained. This method of tying the suspension lines to the looped ends of the stress-carrying tapes permits damaged or broken suspension lines to be easily replaced.

Lastly, the invention is characterized by the provision of a main parachute having a vent located in the top of the canopy and a pilot parachute arranged to cooperate with the vent in such a manner that the pull of the pilot parachute in opening the main parachute keeps the vent closed, the vent automatically and gradually opening to its full extent as the canopy inflates and the pilot parachute becomes inactive.

The various features of novelty wherein my invention is characterized will hereinafter be pointed out with particularity in the claims, but for a full understanding of my invention and its objects and advantages reference may be had to the following detailed description taken in connection with the accompanying drawings, in which:

Fig. 1 is a plan view of a canopy having incorporated therein my improved system of taped reinforcement.

Fig. 2 is an enlarged detail view illustrating the method of attaching the suspension lines to the looped ends of the reinforcing tapes and to the connector link of the parachute harness.

Fig. 3 is a detail view of the canopy in side elevation showing the constriction of the vent when the pilot parachute is pulling.

Fig. 4 is a view in perspective showing the main canopy inflated, the pilot parachute inactive, and the vent open.

Fig. 5 is a plan view showing my novel method of reinforcement applied to a canopy of conventional shape.

Fig. 6 is a diagrammatic view which illustrates the forces acting on the canopy in a "peared out" or partially inflated condition.

Referring more particularly to the drawings wherein corresponding parts are designated by like numerals throughout the several views and in the present embodiment of my invention, I propose to eliminate the usual cord system of suspension and provide a series of non-elastic strips of tape generally designated by numeral 10 in the drawings, which are sewed to the main canopy 11 in diverging plane, as shown in Fig. 1. At their upper ends these tapes are secured to and terminated in a so-called "primary concentration band" or reinforcing member 12, which I find in practice to be located approximately one-third of the distance from the main periphery to the center of area of the canopy. The location of this primary concentration band is governed within limits by the shape of the canopy when it is in the "peared out" position illustrated in Fig. 6, at which time it receives the maximum shock of opening. The "peared out" position may be defined as that position of the canopy when the uppermost portion is filled with air during the process of inflating and during this instant the approximate lower third portion is hanging vertically downward and as a consequence the stresses exerted on this portion of the canopy by the pull of the suspension lines are mostly radial and with little if any stresses circumferentially.

From the points where the diverging tapes terminate in the concentrated band 12 radial tapes 13 secured to the canopy by sewing carry the combined stresses toward the vent ring 14 located at the center of the canopy.

The looped ends of the diverging tapes 10 are secured at their outer ends 15 to a peripheral band 16 with their respective loops 17 projecting slightly beyond the edge of the canopy.

Referring more in detail to Fig. 2 in the drawings it will be noted that the suspension lines 18 are fastened to the tape loops with a double half-hitch as shown by numeral 19, with the standing part 20 sewed to the main part of the suspension lines by zigzag stitching. At their other ends the suspension lines are fastened to the connector link 21 carried on the end of the riser strap 22 of the parachute harness by a clove hitch 23, which loops around the link 21 followed by two half-hitches as shown at 24, the standing part at this end being secured to the suspension lines by zigzag stitching as heretofore noted.

Heretofore it has been difficult to secure suspension lines to the canopy or connector link by knotting and yet develop the full strength of the line because unless properly protected ordinary knots tend to cut upon themselves and thus reduce the strength of the joint. On the other hand knots tied in the manner herein indicated and secured by stitching, as described above, are found not to cut upon themselves and the full strength of each line may thus be obtained.

Referring to Figs. 3 and 4 it will be noted that the vent ring 14 heretofore mentioned is reinforced with a heavy band of fabric 25, which carries a plurality of grommets 26 through which is threaded a cord 27 tied together at 28 and forming a loop 29 which is larger than the vent ring when extended. The free end 30 of the cord 27 is adapted to be secured to the pilot parachute 31. Thus in operation, when the main parachute is in the so-called "strung-out" position prior to opening, the pull of the pilot parachute 31 pulling hard on the cord 27 tends to close the vent in the manner shown in detail in Fig. 3. On the other hand after the main parachute begins to inflate the pulling force of the pilot parachute gradually decreases and the expansion of the main parachute forces the vent to open to its fullest extent as shown in Fig. 4.

While I have illustrated and described the preferred form of construction of carrying my invention into effect it is to be understood that variations and modifications may be had without departing from the spirit of the invention.

I therefore do not wish to be limited to the concise detailed construction set forth, but desire to avail myself of such variations and modifications as may come within the scope of the appended claims. Having thus described my invention, what I claim as new and desire to secure by Letters Patent is:—

1. A parachute comprising in combination, a canopy, a reinforcing band spaced from the periphery of said canopy and crisscrossed reinforcing tapes forming a double Warren truss arrangement interposed between the periphery of said canopy and said reinforcing band, said reinforcing band being located approximately one-third of the distance from the periphery of said canopy to the center of area thereof.

2. In combination a main parachute having a vent and pilot parachute for said main parachute and means cooperating with said vent and operated by the pull of the pilot parachute to maintain said vent closed when said main parachute is inflating.

In testimony whereof I affix my signature.

EDWARD L. HOFFMAN.